United States Patent Office 2,986,695
Patented May 30, 1961

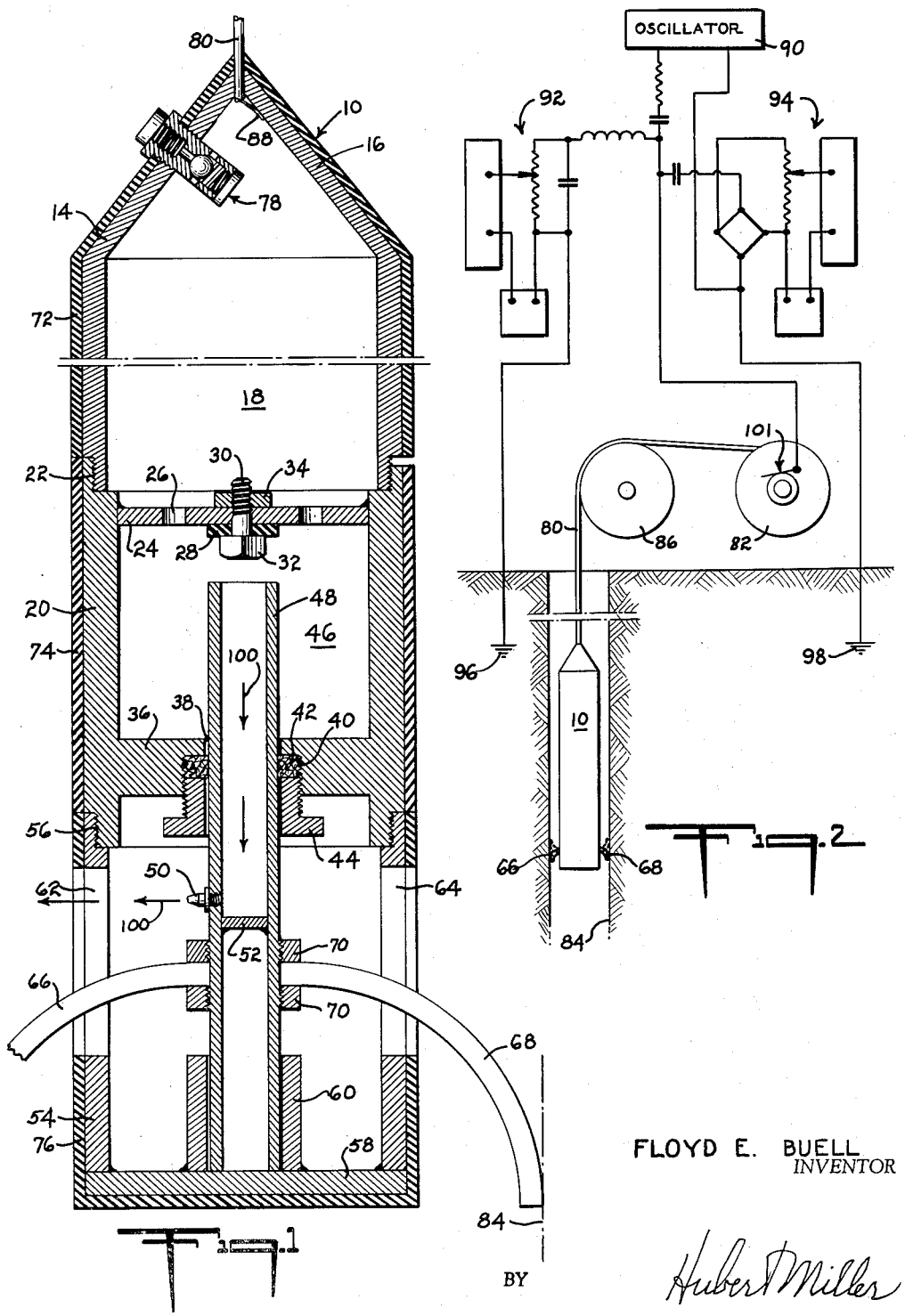

2,986,695
ELECTRICAL WELL LOGGING APPARATUS
Floyd E. Buell, Medicine Lodge, Kans., assignor to Shell Oil Company, New York, N.Y., a corporation of Delaware
Filed Nov. 13, 1956, Ser. No. 621,702
8 Claims. (Cl. 324—10)

This invention relates generally to well logging apparatus, and pertains more particularly to apparatus of this character for obtaining information regarding underground strata defining a dry bore hole.

Well logging operations involving the use of electrical phenomena are old and well known. However, in the carrying out of these operations the determination of strata composition can be no more accurate than is the procured electrical data. In other words, if faulty or inaccurate electrical readings are obtained, then the analysis as to the specific underground formations at the various depths will be in error, in some instances being worse than useless because of its misleading effect.

Accordingly, it is a primary object of the present invention to produce electrical well logging electrode apparatus that will give consistently accurate electrical readings for dry bore holes. In the past, spring actuated contactors or brushes have been employed with the consequence that the remotely located operator of the equipment is never certain when good electrical contact is being established with the wall of the bore hole; hence, he is never sure of the readings he is taking. Broadly speaking, an aim of the instant invention is to obviate entirely the need for metallic engagement of any part of the lowered electrode with the wall of the bore hole. Instead the invention embodies a unique means of positively assuring good electrical contact between the electrode and the wall of the bore hole.

Another object of the invention is to provide a well logging electrode that can be lowered and raised rapidly when making the readings thereby reducing the time that it takes to make a complete log.

A still further feature of the invention is that the electrical contact between the electrode and the bore hole wall can be controlled by an operator at the earth's surface.

The invention, together with other objects attending its production, will be more clearly understood when the following description is read in connection with the accompanying drawing, in which:

Figure 1 is a longitudinal sectional view of the electrode itself, and

Figure 2 is a schematic representation of the electrode in actual use, the view including associated conventional circuitry for obtaniing the desired electrical readings.

Describing first the improved electrode illustrated in Fig. 1, which has been designated in its entirety by the numeral 10, it will be seen that the electrode comprises a generally cylindrical housing or casing having an upper body portion labeled 14 provided with an integral conical upper top 16, the portion 14 being relatively long so as to provide an elongated chamber 18 capable of storing sufficient liquid therein to produce a comparatively sizeable static head. The reason for this will be clarified herein after, but at this time it might also be mentioned that the body portion can be maintained under pressure in lieu of the above-mentioned static head.

Next below the body portion 14 is an intermediate body portion 20 threaded at 22 for the reception of the lower end of said portion 14. Adjacent the upper end of the intermediate portion 20 is a partition 24, welded or otherwise anchored to the inner wall of the intermediate portion 20, the partition containing a plurality of apertures 26. For a purpose soon to be explained, the partition 24 may serve as a supporting means for a valve seat 28, preferably in the form of a compressible rubber washer because of the remaining valve structure with which said seat is intended to cooperate. Retaining the seat 28 against the underside of the partition 24 is a bolt 30 having a head 32 of smaller diameter than the seat. On the upper or shank end of the bolt 30 is a nut 34.

At the lower end of the intermediate body portion 20 is another partition 36, this partition being shown cast integrally with said portion 20 and being imperforate with the exception of a centrally disposed bore 38. The bottom of the bore is counterbored at 40 for the accommodation of suitable packing material 42. The counterbore is threaded to receive a gland member 44. Partitions 24, 36 form a second chamber 46 which communicates with the upper chamber 18 via the partition apertures 26 for the storage of an electrically conductive liquid.

Extending upwardly into the chamber 46 through the packing gland 42 is a reciprocable valve head in the form of a tubular member 48, the upper end of which is adapted to seat on seat 28 to thereby prevent any liquid from escaping from chamber 46. Carried by the valve head 48 is a radially projecting nozzle 50 adapted to discharge a fine stream of electrically conductive liquid from chamber 46 laterally through a registering aperture 62 against the wall of the bore hole. Escape of liquid through the lower end of the head 48 is prevented by means of a plug or partition 52 secured, as by welding, within the tube.

Encircling the tubular member 48 in a spaced relation therewith is a lower body portion 54 threadedly secured to the portion 20 at 56 and having a flat bottom 58 to which is fixedly secured an upstanding collar 60. The collar 60 serves as a guide for the lower end of the tubular valve head 48 which is reciprocable therein. The body portion 54 is provided with a plurality of longitudinally extending slots 62 and 64. Through these slots project semi-rigid actuating fingers 66 and 68. These fingers are made of relatively stiff but yieldable electrically non-conductive material. The inner ends of these actuators 66, 68 are anchored to the tube 48 by means of a pair of collars 70. Fingers 66, 68 are of sufficient length that their outer ends frictionally contact and are deformed by the bore hole wall when the electrode is lowered into the well, as clearly shown in both drawing figures.

These exterior surfaces of the assembled body sections 14, 20 and 54 are provided with heavy coatings of insulating material, the respective coatings or jackets being designated by the numerals 72, 74 and 76.

For the purpose of introducing liquid into the chambers 18, 46 constituting the reservoir, a conventional spring-closed valve assembly 78 is provided. By virtue of such an arrangement the reservoir may be pressurized after having been filled with water or other electrically conductive liquid. In this regard, it is to be understood that the body portion 14 may be of sufficient length to provide ample static head without pressurization. When relying solely upon a static head it is usually desirable to have the chamber 18 vented to atmosphere through its top 16, whereby the liquid can flow at a uniform discharge rate through the nozzle 50. Such vent can be provided by using a drilled plug (not shown) for valve 78.

It is contemplated that conventional equipment will be used for lowering the described electrode into a bore hole, and for obtaining the desired electrical data. Such equipment is shown schematically in Fig. 2. A metallic cable or electrical conductor 80 is shown wound about a cable reel 82. In order to indicate the amount of cable payed out, and hence the depth to which the electrode 10 has been suspended or lowered into a dry bore hole 84 of an oil well, a measuring reel 86 is employed over which said cable is trained. At this point it might be well to explain that the cable serves a dual purpose, being employed for raising and lowering the electrode 10 within the hole 84, and also for supplying electric current to the housing formed of the body portions 14, 20 and 54. Cable 80 is electrically connected at 88 to body section 16.

Being old and in common usage the electrical circuit used in conducting the strata explorations will now be only briefly touched upon. The circuit of Fig. 2 includes an oscillator 90 which supplies A.-C. power for potential determination to circuitry 92 on the left and rectified power to circuitry 94 on the right for resistance measurements. It will be observed that the circuitry 92 is grounded at 96, whereas the circuitry 94 is grounded at 98. Cable 80 is connected to oscillator 90 by means of a conventional ring and brush assembly 101 on reel 82.

*Operation*

A typical operational sequence will now be presented. With the electrode 10 attached to the cable 80, and with the reservoir 18, 46 filled preferably with water or water-salt solution, cable 80 is payed out from the cable reel 82 to lower the electrode into the dry bore hole 84. Frictional contact of the outer ends of fingers 66, 68 with the bore hole wall bows the fingers upwardly, and this frictional drag of the fingers is transmitted to tubular valve head 48, and serves to maintain its upper end seated on seat 28 to prevent loss of liquid from the reservoir.

When the electrode 10 has been lowered to the depth at which the conductive tests are to begin, it is only necessary to momentarily reverse the rotation of the reel 82. This causes the fingers 66, 68 to flex from their dotted line position in Fig. 2 to their solid line position. Frictional drag in the resulting downward direction moves valve head 48 to its Fig. 1 position and allows liquid from chamber 46 to flow through valve 48 and out through nozzle 50 and through aperture 62 into electrical contact with the adjacent underground strata defining the bore hole, as indicated by the sequential arrows 100. Owing to the orifice-like nozzle 50, the discharge through said nozzle is in the form of a fine stream.

This liquid stream from nozzle 50 completes the circuit from cable 80 to the ground connections at 96 and 98, and the desired readings for the electrical resistance etc. of the adjacent underground strata are obtained from the conventional electrical apparatus previously described.

Having described the invention with sufficient clarity to enable those familiar with this art to construct and use it, I claim:

1. The improvement in electrical well logging apparatus for obtaining information regarding underground strata defining a dry bore hole which comprises: an elongated hollow electrode having a reservoir therein for containing an electrically conductive liquid; valve means mounted within said electrode near the lower end of said reservoir for releasing liquid therefrom; a laterally directed nozzle housed within said electrode and in communication with said reservoir via said valve means for discharging liquid laterally from said electrode onto the adjacent wall of the bore hole; means for actuating said valve means into open position to afford discharge of liquid from said reservoir through said nozzle; and means for suspending said electrode at various depths within the bore hole including an electrical conductor connecting with said electrode.

2. The improvement set forth in claim 1 including non-conductive means connected to said valve means and engageable with the wall of the bore hole for actuating said valve means into open position.

3. Electrical well logging apparatus for obtaining information regarding underground strata defining a dry bore hole in the earth comprising: an exteriorly electrically insulated elongated hollow electrode having a compartment therein constituting a reservoir for electrically conductive liquid; means for moving said electrode longitudinally along said dry bore hole including an electrical conductor connected to said electrode and extending to the surface of the ground; an electrically conductive liquid stream discharging nozzle mounted within the confines of and electrically connected to said electrode, said nozzle being in communication with said reservoir and being positioned to discharge a stream of liquid received therefrom in a direction transverse to the long dimension of said electrode; an aperture in the side wall of said electrode through which conductive liquid is discharged in solid stream from said nozzle into electrical contact with the adjacent wall of said bore hole, the conductive liquid stream constituting the sole conductor of electricity between the electrode and the wall of said bore hole; and a valve interposed between said reservoir and said nozzle for controlling the flow of liquid from the reservoir out through said nozzle.

4. The mechanism described in claim 3, and means for actuating said valve after the electrode has been lowered into the bore hole.

5. Electrical well logging apparatus for obtaining information regarding underground strata defining a dry bore hole in the earth comprising: an elongated hollow electrode having a compartment therein constituting a reservoir for electrically conductive liquid; means for moving said electrode longitudinally along said dry bore hole including an electrical conductor connected to said electrode and extending to the surface of the ground; an electrically conductive liquid stream discharging nozzle mounted within the confines of and electrically connected to said electrode, said nozzle being in communication with said reservoir and being positioned to discharge a stream of liquid received therefrom in a direction transverse to the long dimension of said electrode; an aperture in the side wall of said electrode through which conductive liquid is discharged in solid stream from said nozzle into electrical contact with the adjacent wall of said bore hole, the conductive liquid stream constituting the sole conductor of electricity between the electrode and the wall of said bore hole; and a valve interposed between said reservoir and said nozzle for controlling the flow of liquid from the reservoir out through said nozzle.

6. The mechanism described in claim 5, and means for actuating said valve after the electrode has been lowered into the bore hole.

7. Electrical well logging apparatus for obtaining information regarding underground strata defining a dry bore hole in the earth comprising: an elongated hollow electrode having a compartment therein constituting a reservoir for electrically conductive liquid; means for moving said electrode longitudinally along said dry bore hole including an electrical conductor connected to said electrode and extending to the surface of the ground; an electrically conductive liquid stream discharging opening within the confines of said electrode, said opening being in communication with said reservoir and being positioned to discharge a stream of conductive liquid received therefrom in a direction transverse to the long dimension of said electrode and into electrical contact with the adjacent wall of said borehole, the conductive liquid stream constituting the sole conductor of electricity between the electrode and the wall of said bore hole; and a valve interposed between said reservoir and said opening for controlling the flow of liquid from the reservoir out through said opening.

8. The mechanism described in claim 7, and means for actuating said valve after the electrode has been lowered into the bore hole.

References Cited in the file of this patent

UNITED STATES PATENTS

| | | |
|---|---|---|
| 2,393,009 | Chun | Jan. 15, 1946 |
| 2,637,768 | Bragg | May 5, 1953 |